3,540,144
ARTIFICIAL BAIT
Philip W. Gurka, 180 Bellevue Ave.,
Upper Montclair, N.J. 07043
Filed July 29, 1968, Ser. No. 748,281
Int. Cl. A01k 85/00
U.S. Cl. 43—42.33     4 Claims

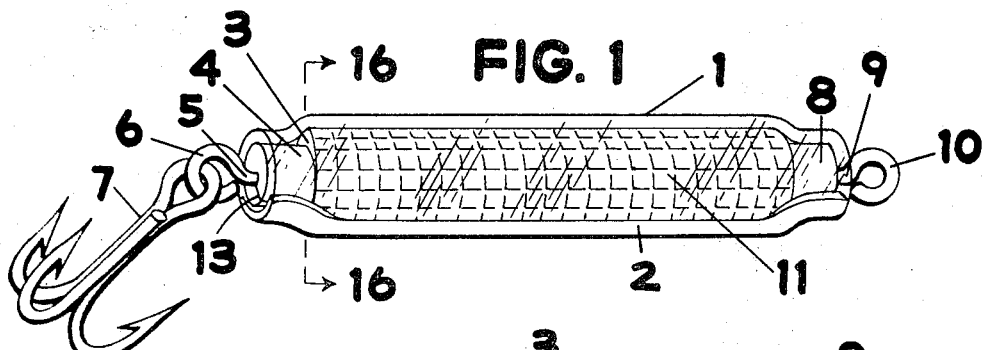
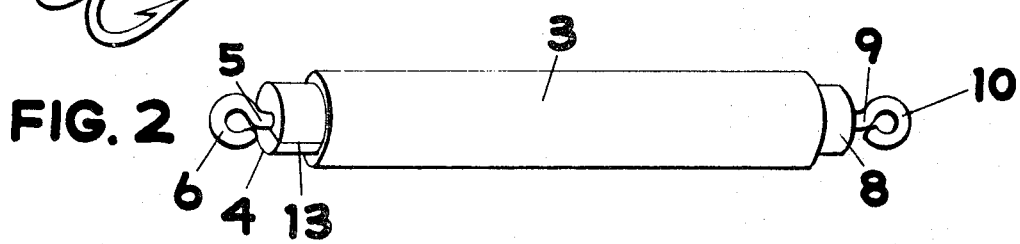
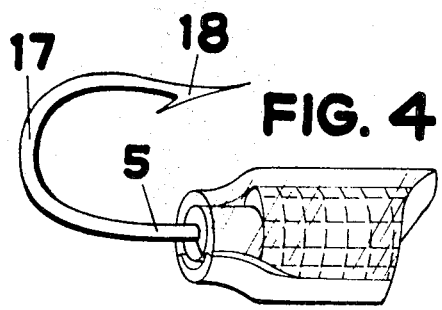
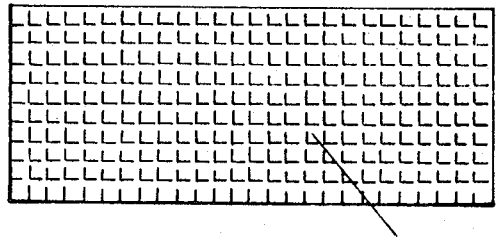
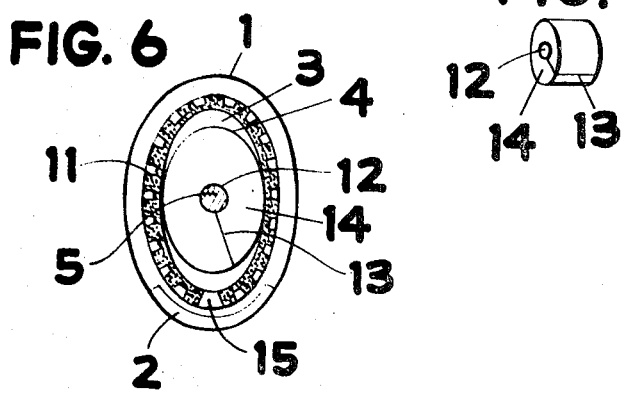
INVENTOR
Philip W. Gurka

# United States Patent Office 3,540,144
Patented Nov. 17, 1970

ABSTRACT OF THE DISCLOSURE

Artificial bait consisting of a major body portion of oval cross-section, a shaft emerging from each of opposite longitudinal ends of said body portion, a sleeve mounted on each shaft, thin material having a bright embossed surface providing light-reflecting facets and covering said body portion, and a transparent cover portion for said body portion, sleeves and thin mateiral, contractively enclosing said assembled portions to provide a water-tight fit.

---

This invention relates to improvements in artificial baits that have a three-dimensional appearance and usually necessitate costly molding processes and painting. They have bright embossed surfaces that are imbedded in a clear transparent plastic and at times have rather indistinctly embossed surfaces of bright gold or silver. Also, they usually involve spray and hand painting techniques.

This invention also relates to improvements in artificial baits that do not have a three-dimensional appearance but necessitate costly plating, costly embossing, costly custom designed tooling, costly metals and painting.

It is an object of this invention to provide an artificial bait composed of suitably colored materials that avoid the need of painting.

It is also and object of this invention to provide an artificial bait composed of suitable material colored to resemble a fish.

It is a further object of this invention to provide an artificial bait that has a three-dimensional appearance of an injection molded piece.

A further object of the invention is to provide an artificial bait which is simple in construction and efficient in use.

The exact nature of the present invention, as well as other objects and features thereof, will become apparent from the following description when considered in connection with the accompanying drawings, in which:

FIG. 1 is a side perspective view of an artificial bait constructed for use with a plurality of hooks, in accordance with the present invention.

FIG. 2 is a side perspective view of the major body portion of the form of FIG. 1, showing the reduced end sleeve and shaft portions.

FIG. 3 is a side perspective view of the open-ended transparent tubular cover portion equipped with a stripe as it would appear when set after application.

FIG. 4 is a fragmentary view showing a modification using only one hook.

FIG. 5 is a plan view of the embossed surface of a part of the bait.

FIG. 6 is an enlarged transverse sectional view on the line 16—16 of FIG. 1.

FIG. 7 is a side perspective view of a reduced-end ear portion.

Referring to the drawings it will be seen that the artificial bait is composed of layers of suitable material and coloring.

FIG. 1 illustrates one embodiment of the finished product and readily shows the open-ended transparent tubular cover 1 with stripe 2 conforming to the periphery of the composite inner body, consisting of an elongated slat-like oval bar forming a major body portion 3, as in FIG. 2. There is a reduced-end sleeve portion 4, carried on shaft 5, that emerges from one longitudinal end of said major body portion 3, terminating in this instance in an eye 6 that facilitates connection to a hooking arrangement 7, FIG. 1.

There is also a reduced-end sleeve portion 8, as clearly seen in FIG. 2, carried on shaft 9 that emerges from the other end of said major body portion 3 and terminates in an eye portion 10 to facilitate connection to a fishing line, not shown. The major body portion 3 is provided with a preferably thin shiny material with an embossed surface 11 of numerous scale-simulating facets for reflection of light, so that the artificial bait will be very attractive to fish.

The major body portion 3 is desirably oval in cross section, as in FIG. 6, and substantially uniform in width from end to end. The reduced-end sleeve portions 4 and 8 also are appropriately oval in cross section and have core apertures 12, as illustrated in FIG. 7, to provide for shafts 5 and 9, as clearly seen in FIG. 2. Said reduced-end portions 4 and 8 are desirably substantially uniform in diameter from end to end and in this instance made of a pliable plastic, smooth surfaced and slit at 13 radially through the wall 14 to the core aperture 12, as illustrated by FIG. 7, thereby facilitating application to the shafts 5 and 9 by way of the slit 13 as seen in FIG. 2.

The embossed surface 11 is preferably of metallized Mylar material made to adhere to the major body portion by any suitable means, such as a pressure-sensitive adhesive backing. FIG. 5 illustrates a thin sheet of such material having a suitably embossed surface 11. The application can clearly be seen as illustrated by FIG. 6, whereby the embossed surface 11, beginning at the point of contact, converges in a circumferential manner creating an elongated seam 15.

Lead has been found to be an excellent material for the major body portion 3, FIG. 2, as it can be molded directly upon the shafts 5 and 9. But any suitable material may be used depending upon desired effects of weight or manufacture. The open-ended transparent tubular covering 1, FIG. 3, equipped with a colored stripe 2 is appropriately formed of a plastic tubing having a memory that can be controlled and set by any suitable means. This means may be heat for shrinking the tubing after being slidably engaged on the said inner portions, or the tubing could be mdae very pliable with solvent and force fitted, and set upon evaporation of the solvent.

Upon application of the said covering 1, to the periphery of the said inner portions, the stripe 2 as shown in FIG. 6 conceals the elongated seam 15 and desirably the slit 13. Control in application of the transparent outer covering 1, FIG. 1, must be maintained to insure a high degree of damage-free embossed surface 11. The shafts 5 and 9 are composed of a suitable metal that is little affected by water, such as silver-nickel, or a metal plated or tinned.

The open-ended transparent tubular covering 1, together with the stripe 2, may be tinted or colored in any desirable fashion along with the reduced-end sleeve portions 4 and 8, and the embossed surface 11.

While the open-ended transparent tubular covering 1, FIG. 1, together with the stripe 2, acts as a protective cover, a vehicle for portraying color, and a means for concealment, it also contractingly engages the reduced-end portions 4 and 8 in a substantially firm and grasping set that snugly holds the said reduced-end sleeve portions to the major body portion 3, as illustrated at the line 16—16 of FIG. 1. This same contracting engagement binds the slit 13 and forms a watertight fit.

While the shaft 5 in FIG. 1 has an eye 6, to connect with a hooking arrangement 7, said shaft may also continue in length as a reverse bend 17, illustrated in FIG. 4, which terminates in a barbed pointed end 18, thus forming a single hook.

From the foregoing description it is believed that the construction and advantages of the present invention will be readily understood and appreciated by those skilled in the art. The weight and streamline shape makes the present bait or lure ideal for casting, as wind resistance is minimized. Also, the lure does not spin to twist the line when trolled and is very durable in construction. It will also be apparent that the embodiment of the present invention is inherently attractive and decorative in appearance.

It will be further apparent that numerous modifications and variations in the fish lure or artificial bait of the present invention may be made by anyone skilled in the art. in accordance with the principles of the invention herein above set forth, and without the use of any inventive ingenuity. I desire, therefore, to be protected for any and all such modifications and variations that may be made within the spirit of the invention and the scope of the claims hereto appended.

What I claim is:

1. A desirably colored minnow type artificial bait comprising an inner plurality of portions, together with a cover portion, said inner plurality of portions having as a major body portion an elongated slat-like bar of oval cross-section, a shaft emerging from each of opposite longitudinal ends of said major body portion, an end sleeve portion carried by the shaft at one of said longitudinal ends, said shaft at said one end terminating in means to attach a hooking arrangement, an end sleeve portion carried by the opposite shaft, said opposite shaft being adapted to have a fishing line attached thereto, each of said sleeve portions having a smaller cross-section than that of said bar, said major body portion being of substantially uniform width and covered with a thin material having a bright embossed surface portion providing numerous small light reflecting facets in the form of scales, said thin material having a longitudinal seam, said end sleeve portions being pliable, smooth surfaced and each provided with a longitudinal slit through the wall thickness thereof to a core aperture, facilitating application to said shafts, said cover portion being an open-ended transparent tube equipped with a longitudinal stripe providing means to conceal the longitudinal seam, said cover portion provided with means to conform to the periphery of the said assembled inner plurality of portions from one of said end sleeve portions to the other, contractively engaging the said portions in a substantially firm and grasping set, providing snug butt joints between the said major body portion and the end sleeve portions, binding the said longitudinal slits and providing for a watertight fit.

2. A minnow type artificial bait comprising an elongated slat-like major body portion of oval cross-section, a shaft assembled with and emerging from each of opposite longitudinal ends of said body portion, an end sleeve portion carried by the shaft at one of said longitudinal ends, said shaft at said one end terminating in means to attach a hooking arrangement, an end sleeve portion carried by the opposite shaft, said opposite shaft being adapted to have a fishing line attached thereto, each of said sleeve portions being of smaller cross-section than that of said body portion, the latter being of substantially uniform width and covered with a thin material having a bright embossed surface providing numerous small light-reflecting facets over said portion, said thin material having a longitudinal seam, said end sleeve portions being pliable, facilitating application to said shafts, a cover portion as an open-ended transparent tube provided with means to conform to the periphery of the said assembled inner portions from one of said end sleeve portions to the other, contractively engaging the said portions in a substantially firm and grasping set, and binding the said sleeve portions and providing for a water-tight fit.

3. An artificial bait as defined in claim 2, wherein the cover portion is equipped with a longitudinal stripe providing means for concealing areas of manufacture.

4. An artificial bait as defined in claim 2, wherein each end sleeve is provided with a longitudinal slit through the wall thickness thereof to a core aperture.

References Cited

UNITED STATES PATENTS

| 2,480,580 | 8/1949 | Hopkins | 43—42.34 X |
| 2,753,650 | 7/1956 | Rentz et al. | 43—42.33 |
| 3,257,751 | 6/1966 | Benttinen et al. | 43—42.33 |

ALDRICH F. MEDBERY, Primary Examiner

D. J. LEACH, Assistant Examiner

U.S. Cl. X.R.

43—42.34, 42.39